(12) United States Patent
Wickman et al.

(10) Patent No.: US 6,793,409 B2
(45) Date of Patent: Sep. 21, 2004

(54) METHOD TO ALIGN OPTICAL COMPONENTS TO A SUBSTRATE AND OTHER OPTICAL COMPONENTS

(75) Inventors: Randy Wickman, Cadott, WI (US); John Greene, Chippewa Falls, WI (US); Gary O'Connor, Bolingbrook, IL (US); Daniel Mansur, Chippewa Falls, WI (US); David Barneson, Eleva, WI (US); Bryan Gregory, Glen Ellyn, IL (US)

(73) Assignee: Corona Optical Systems, Inc., Lombard, IL (US)

( * ) Notice: Subject to any disclaimer, the term of this patent is extended or adjusted under 35 U.S.C. 154(b) by 0 days.

(21) Appl. No.: 10/368,707

(22) Filed: Feb. 19, 2003

(65) Prior Publication Data

US 2003/0147600 A1 Aug. 7, 2003

Related U.S. Application Data

(62) Division of application No. 09/920,917, filed on Aug. 2, 2001, now Pat. No. 6,547,454.
(60) Provisional application No. 60/234,126, filed on Sep. 21, 2000.

(51) Int. Cl.[7] ................................................. G02B 6/36
(52) U.S. Cl. .............................. 385/88; 385/89; 385/92
(58) Field of Search ............................ 385/88, 89, 92, 385/93, 52, 53

(56) References Cited

U.S. PATENT DOCUMENTS

| | | | |
|---|---|---|---|
| 4,730,198 A | 3/1988 | Brown et al. | |
| 4,741,595 A | * | 5/1988 | Onoda et al. ............... 385/120 |
| 4,779,946 A | 10/1988 | Pimpinela et al. | |
| 5,091,991 A | 2/1992 | Briggs et al. | |
| 5,281,301 A | 1/1994 | Basavanhally | |
| 5,357,593 A | 10/1994 | Bossler | |
| 5,432,878 A | 7/1995 | Smous | |
| 5,539,848 A | 7/1996 | Galloway | |
| 5,574,814 A | 11/1996 | Noddings et al. | |
| 5,590,232 A | 12/1996 | Wentworth et al. | |
| 5,703,973 A | 12/1997 | Mettler et al. | |
| 5,768,456 A | 6/1998 | Knapp et al. | |
| 5,802,236 A | * | 9/1998 | DiGiovanni et al. ........ 385/127 |
| 5,815,616 A | 9/1998 | Bishop et al. | |
| 5,857,049 A | 1/1999 | Beranek et al. | |
| 5,898,806 A | 4/1999 | Nishimoto | |
| 5,909,524 A | 6/1999 | Tabuchi | |
| 5,940,558 A | 8/1999 | Bishop et al. | |
| 6,034,808 A | 3/2000 | Isaksson | |
| 6,095,697 A | 8/2000 | Lehman et al. | |
| 6,097,870 A | * | 8/2000 | Ranka et al. ............... 385/127 |
| 6,112,002 A | 8/2000 | Tabuchi | |
| 6,118,917 A | 9/2000 | Lee et al. | |
| 6,236,786 B1 | * | 5/2001 | Aoki et al. .................... 385/50 |

FOREIGN PATENT DOCUMENTS

JP 10-111750 4/1998

* cited by examiner

Primary Examiner—Rodney Bovernick
Assistant Examiner—Sung Pak
(74) Attorney, Agent, or Firm—Welsh & Katz, Ltd.

(57) ABSTRACT

A method and apparatus are provided for aligning an array of optical devices with optical processing equipment. The method includes the steps of providing a transparent substrate with a plurality of optical transmission paths passing directly through the substrate, providing a plurality of alignment guides on the optical array, providing a complementary plurality of respective alignment guides on the transparent substrate and guiding the optical devices of the array into alignment with the substrate using respective pairs of the alignment guides on the optical array and transparent substrate.

20 Claims, 7 Drawing Sheets

METHOD TO ALIGN OPTICAL COMPONENTS TO A SUBSTRATE AND OTHER OPTICAL COMPONENTS

FIELD OF THE INVENTION

This application is a divisional of U.S. patent application Ser. No. 09/920,917 filed Aug. 2, 2001, now U.S. Pat. No. 6,547,454, which is a continuation-in-part of U.S. Provisional Application No. 60/234,126, filed on Sep. 21, 2000 (now abandoned). The field of the invention relates to optoelectric data transmission systems, and to interconnection of subsystems.

BACKGROUND OF THE INVENTION

Precision alignment of optical arrays to ribbon fiber can be difficult. In order to minimize loss in multimode fiber, a placement tolerance of +/−5 μm (micrometers) is needed. In contrast, the 3 standard deviation alignment tolerances of single-mode optical fiber is less than 1 micron. To achieve this alignment tolerance, active alignment and complex vision systems are often used. This alignment requirement reduces manufacturing output and yield, making optical assemblies more costly than traditional electronic packaging techniques.

Active alignment uses the features of optical components to align optical fibers to an optoelectronic device. For example, in coupling an optical fiber to the surface of a light emitting laser, a device such as a photodetector is used in alignment. The photodetector is positioned at one end of the optical fiber, detecting the light from the surface emitting laser at the other end of the optical fiber. The optical fiber's position, relative to the surface emitting laser, is adjusted until light hitting the photodetector reaches a maximum. When the photodetector senses a maximum amount of light, the fiber is bonded in a permanent position. Increased manufacturing demands have caused a need for replacement of this type of alignment, as it can be time consuming and costly.

Electronic packaging assemblers often use pick-and-place methodology to position electronic components for subsequent assembly. Components are picked from a component holder and placed on a substrate no more than 25 microns from an absolute reference position. This alignment tolerance is 5 times greater than that required for low-loss optical interconnects.

Thus, there is a need for high precision alignment and placement of optical components. Described herein is a detailed methodology for accurately aligning optical components to one another, using features applied to the optical components.

SUMMARY

A method and apparatus are provided for aligning an array of optical devices with optical processing equipment. The method includes the steps of providing a transparent substrate with a plurality of optical transmission paths passing directly through the substrate, providing a plurality of alignment guides on the optical array, providing a complementary plurality of respective alignment guides on the transparent substrate and guiding the optical devices of the array into alignment with the substrate using respective pairs of the alignment guides on the optical array and transparent substrate.

DETAILED DESCRIPTION OF THE DRAWINGS AND EMBODIMENT

Figure 1:
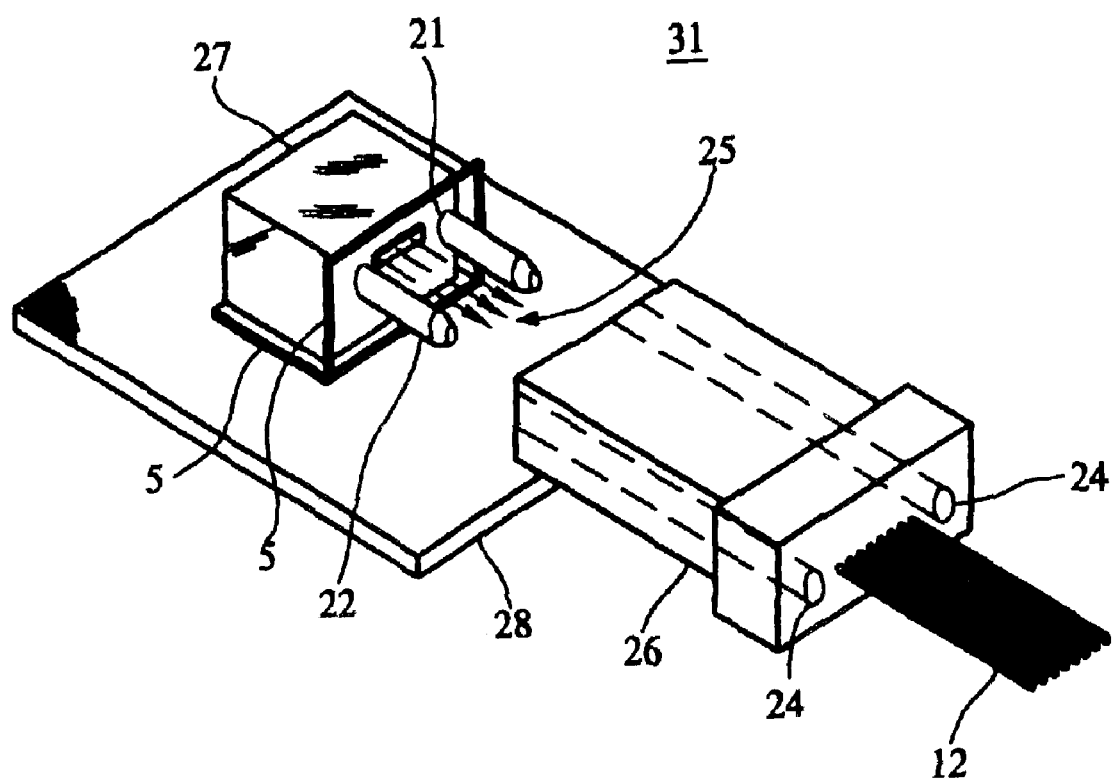
FIG. 1 is a perspective view of a waveguide system and a transparent substrate with corresponding guide pins under an illustrated embodiment of the invention.
Figure 2:
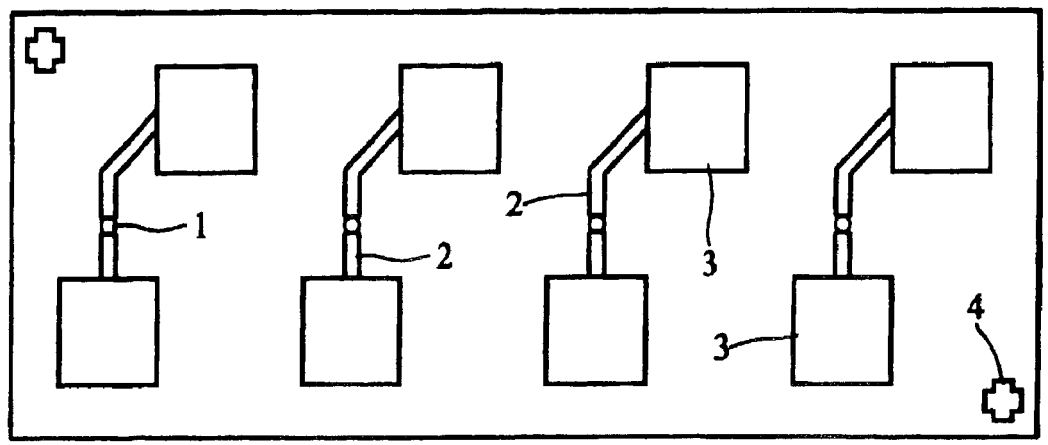
FIG. 2 is a top view of an optical array of FIG. 1 showing optical ports, electrical features and registration targets.

FIG. 1 shows an optical coupler and converter assembly 31 in a context of use and generally in accordance with an illustrated embodiment of the invention. Included within the converter assembly 31 may be an optically transparent substrate 5 and optical array 8 (FIG. 2). The optically transparent substrate 5 may be attached to a guide pin holder 27. Both the substrate 5 and guide pin holder 27 may be attached to a common printed circuit board (PCB) 28. Transmission paths 25 of the optical array 8 (FIG. 2) pass through the optically transparent substrate 5. An external waveguide coupler 26 containing optical fibers 12 may be aligned to the optically clear substrate 5 and the optical array 8.

The optically transparent substrate 5 may be provided with guide pin apertures 21. Guide pin apertures 21 may be laser drilled to relatively close tolerances for insertion of the guide pins 22. The external waveguide coupler 26 may contains guide pin apertures 24 for receiving guide pins 22 and for aligning the optical fibers 12 to the transparent substrate 5. The guide pin apertures 24 and/or guide pins 22 form alignment references for coupling the converter assembly 31 to other optical devices.

The relatively limited tolerances against lateral misalignment provided by the combination of the aperture 2 1, pin 22 and connector aperture 24 allows for the precise alignment of the external waveguide coupler 26 and optical fibers with the substrate 5. FIG. 1 shows guide pins held in place by an accompanying pin holder 27. Thus, the pins 22 are placed through the optically transparent substrate 5, and the external waveguide system 26 is aligned to the optical array by operation of the substrate 5 which functions as an alignment substrate that aligns the transmission paths of the optical array 8 with the transmission paths of the fibers 12.

While the optical assembly 31 is shown in the context of converting between an electrical signal on the PCB 28 and an optical signal on the fibers 12, it should be understood that the converter assembly 31 may be used in any of a number of other applications. For example, the assembly 31 could be coupled electrically to a communication cable and optically coupled to another optical array on a circuit board using the guide pins 22 for alignment to form an electro-optical isolator.

FIG. 2 shows an optical array 8 containing optical ports 1 (e.g., VCSEL lasers, DFB lasers, photodetectors, etc.) with transmission paths 25 extending normal to the top surface (i.e., out of the page). Thus, the direction of light is normal to the surface of interest. The optical array 8 may be fabricated using conventional techniques.

Also shown on the array 8 are electrical pads 3, electrical traces 2, and registration targets 4. The assembly process of the optical array 8 could use registration targets 4 to generally locate the position of the optical array 8 on the corresponding substrate 5 (as described in more detail below). The electrical traces 2, electrical pads 3, or optical ports 1 could also be used as registration targets. The scope of the registration targets is not limited to one or the other, but could include a combination of registration targets. For instance, electrical traces 2 and optical ports 1 could both be used as registration targets 4 in determining the location of the optical array 8 on the array substrate 5. In addition to registration targets 4, other alignment structures and features can also be placed on the surface to further guide the array 8 into a precise alignment with the transparent substrate 5. The distances from the registration targets to the outer boundaries of the optical device 8 may be programmed into the pick and place machinery. Thus, the delivered location of the optical array 8 by the pick and place machinery is known.

In order to further guide the array 8 into precise alignment with the substrate 5, a series of alignment devices 6, 7 (shown in FIG. 3) may be fabricated on mating surfaces of the array 8 and substrate 5. The alignment devices may be fabricated on the same side of the array 8 as the ports 1. In some cases (described below) the alignment devices may be fabricated directly over the ports 1.

The registration and alignment features 6, 7 on the optical array 8 are not limited to any type of material, or any particular location on the surface of the optical array. The registration features are not limited to any number either. For instance, there could be 'm' optical ports 1, 'n' electrical pads 3, and 'o' electrical traces 2, and some combination used as registration features.

Figure 4:
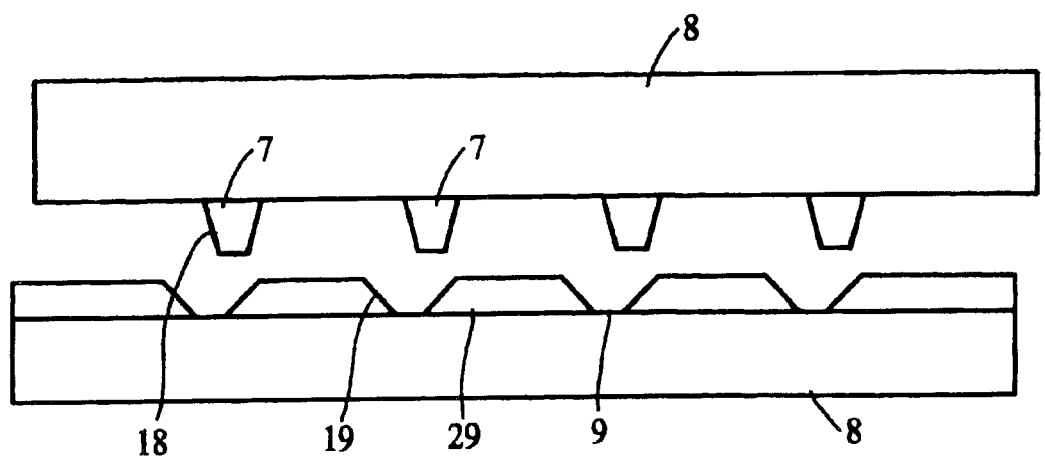
FIG. 4 is a cross-sectional view of an optical array and substrate of FIG. 1 with a plurality of alignment features placed on a substrate also containing a plurality of alignment features.

The alignment devices 6, 7 may be fabricated using convention fabrication technique. FIG. 4 shows a layer 29 of polyimid may be disposed over the mating surfaces of the array 8 and substrate 5. The layer 29 of polyimid may be any commercially available photoreactive material (e.g., 20–100 microns thick) provided with an associated etching agent.

A mask may be placed over the polyimid layer on the array 8. The mask may transmit (or block) light in areas defining the alignment devices 6, 7. The mask and layer may then be exposed and the excess material etched away to leave the devices 6, 7, shown in FIG. 3. The devices may be round, square or any other shape.

Similarly, a mask may be placed over the polyimid layer 29 disposed on the substrate 5. The mask on the substrate 5 may be aligned to the holes 21. Once aligned to the substrate 5, the polyimid layer 29 may be exposed and excess material etched away.

In general, the alignment devices 6, 7 may be provided as complementary post and receptacle type devices (FIG. 4). Posts 6, 7 may be fabricated on the array 8 and complementary receptacles 9 may be fabricated on the substrate 5. Alternatively, any combination of posts 6, 7 and receptacles 9 may be placed on the array 8 or substrate, the only limitation being that any corresponding locations on the array 8 and substrate 5 would include a complementary pair of alignment devices 6, 7 and 9.

Figure 3:
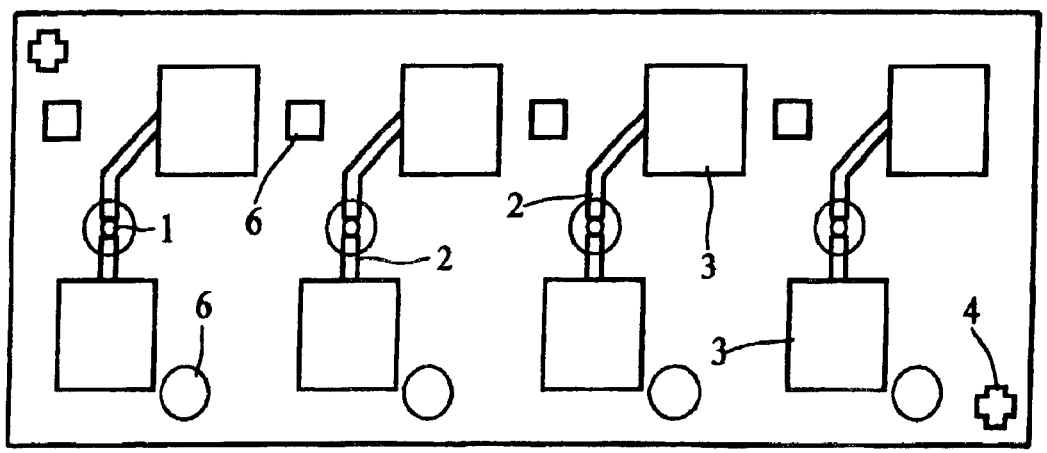
FIG. 3 is a top view of the optical array of FIG. 1 showing a plurality of alignment structures, as well as optical ports, electrical features and registration targets.

If the registration features (i.e., alignment devices) 7 are optically transparent, they can be placed over the active optical regions of the ports 1, as shown in FIG. 3. When placed over the optically active regions, the alignment devices 7 have been found to function as a lens, directing light along a predictable path through the substrate 5 into the fibers 12.

Whether over the active optical region 1 or not, these alignment structures 6, 7 may have tapered sides of different sizes and profiles that may be used to guide and align the optical-component to the mating substrate 5. Alignment features 6 are not limited to the optical array 8 though. Coinciding, complementary alignment features 6, 7, 9 can be placed on the substrate 5 or on the metal traces 11. The metal traces 11 may be disposed on the substrate 5 and used to connect the pads 3 to external connections (e.g., on a supporting printed circuit board). Thus, a combination of alignment features 6, 7, 9 on both the substrate and optical array surface can be used in guiding and aligning the components to their proper location.

Figure 5:
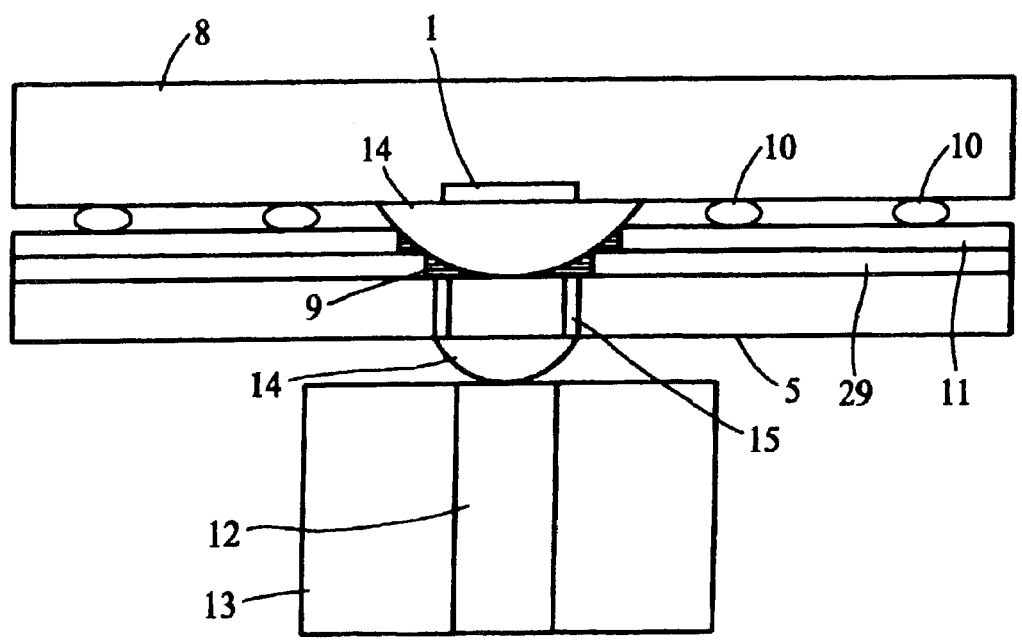
FIG. 5 is a cross-sectional view of an optical array, substrate and optical fiber of FIG. 1 under an alternate embodiment.

FIG. 4 illustrates the relationship between the alignment features 6, 7 of the optical array 8 and those corresponding features 9 of the substrate 5. The structure of the alignment features 6, 7, 9 functions to guide the optical component 8 into its correct position on the substrate 5. The substrate 5 could have built-up sections or removed areas 9, such as guide pin apertures 21, (see FIG. 1), depending on the desired features for the application. The substrate 5 could also have on its surface a layer of a polyimid 29 or similar material. This material might be easier in manufacturing to a desired shape or form. FIG. 5 illustrates what a substrate S might look like with a polyimid layer 29 between the optical array 8 and the substrate 5 and with conductive traces partially disposed over the layer 29.

Alignment features 6, 7 on the substrate 5 or polyimid are not limited to one side. They could be located on the surface closest to the optical fiber 12 or on the surface closest to the optical array 8. The initial physical placement of the optical components 8 can be done using standard pick-and-place equipment. Optical alignment occurs as the alignment features 6, 7, 9 engage and lock into a final position. Tapered edges 18, 19 of the alignment features allow a smooth initial placement, and automatic movement into the optical alignment.

Figure 6:
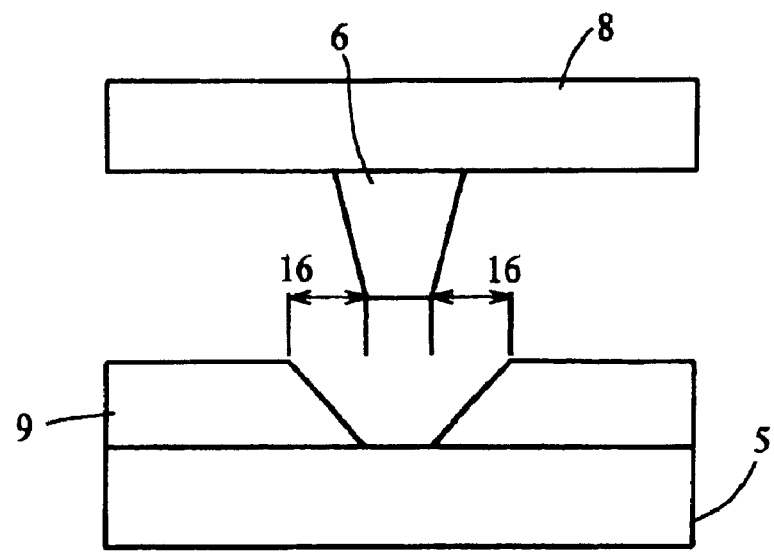
FIG. 6 is a side cut-away view of an alignment feature of the optical array of FIG. 4.

The tapered alignment features (18, 19) of both surfaces can be of different sizes in order to complete the alignment process. The tolerances 16 of the pick and place machine may be comparable in scope to the operable range of the alignment feature 6, as shown in FIG. 6. Otherwise, the initial alignment of the features may not be close enough to render the tapered sides functional. Thus, the range of self-alignment provided by the alignment features 6 would be expected to be larger than the pick and place machinery tolerance 16.

The tapered surfaces 18, 19 may be shaped using any of a number of different methods. Under a first method, the natural process of etching may be used to control the rate of taper. Since an etchant would be expected to etch at a constant rate, it would be expected that a top of a hole 9 may have a larger diameter than a bottom of the hole.

Alternatively, the mask used to create the receptacle may have feathered edges, thereby increasing an etching rate around a periphery of an entry location of the hole. By varying the gradation of the feathering by distance to an edge of the hole 9, varying degrees of taper may be achieved.

The same process used for the receptacles 9 may be applied to the posts 6, 7. For a more extreme taper, a feathering of the mask may be used to achieve any desired amount of taper.

For example, the diameter of the tip of the post 6, 7 may be approximately 70 microns. The diameter at the bottom of the receptacle may also be 70 microns. The taper of the post 6, 7 may be 45 degrees. The taper of the receptacle may be 45–70 degrees.

If the length of the post 6, 7 and depth of the receptacle are each 70 microns, then a 45 degree taper within the receptacle 9 would provide an entrance to the receptacle 9 with a diameter of approximately three times the diameter of the tip of the post 6, 7. Because of the taper, the array 8 may be placed at least 70 microns to either side of the center of the receptacle 9 and still operatively engage the receptacle 9. Alignment would be achieved in this example because gravity would cause the tapered post 6, 7 to slide down the tapered receptacle 9 until the post 6, 7 reaches the bottom of the receptacle 9. When the post reaches the bottom of the receptacle 9, substantially complete alignment would be achieved.

Further, the taper of the post 6, 7 functions to further shape and direct optical transmission. The tapered post 6, 7 may form a frustrum-shaped lens directing light along an optical transmission path passing through the substrate 5.

Many optical components could be placed on the substrate, as shown in FIG. 4. Once the critical alignment has been made, the optical arrays 8 may be held in place by a mass rapid bonding process. Bonding could include adhesives, solder, stud bumps, or a similar material.

If the alignment material is transparent such as a polyimid, then the material can be modified to form an optical-wavefront transforming structure, as shown in FIG. 5. In this example, the alignment device is a lens and lens receptacle 9. Such structures may include, but are not limited to negative or positive lens, Fresnel lens, or optical guide, allowing more efficient coupling of the light between the active optical component 1 and a light guiding device such as an optical fiber 12.

Figure 7:
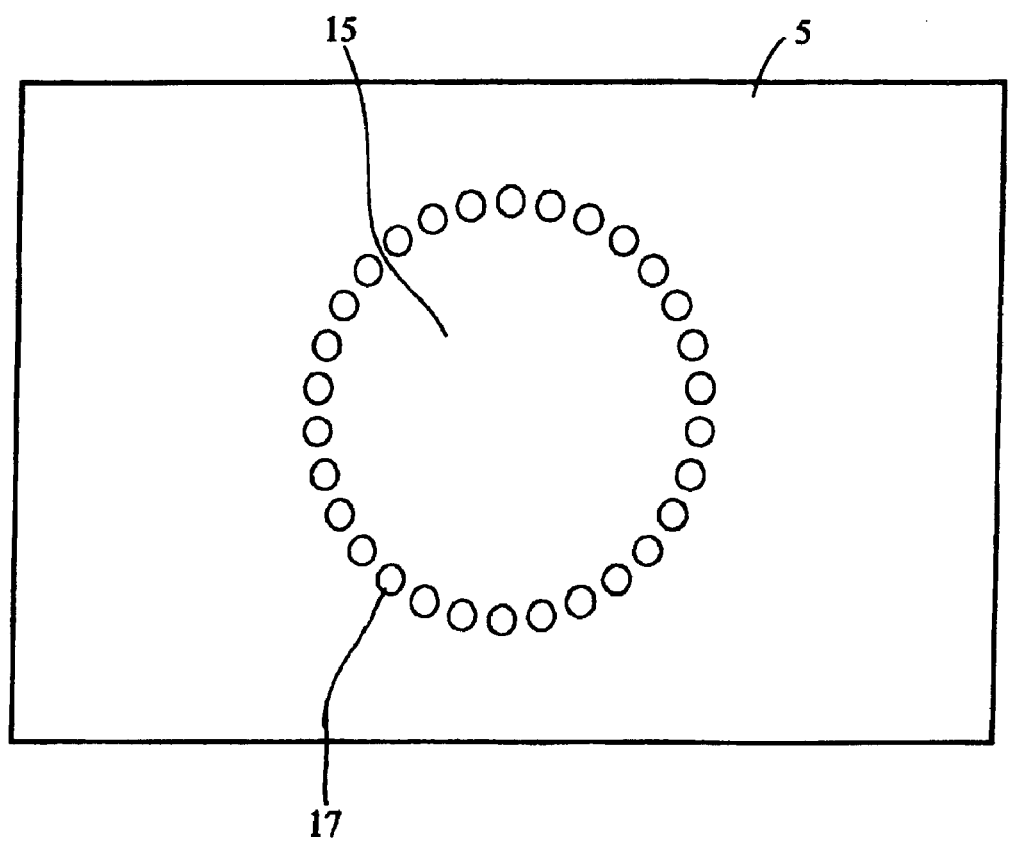
FIG. 7 is a top view of an optical via that may be used with the system of FIG. 1.

An optical-wavefront transforming or confining structure, here called an optical via (or waveguide) 15, can also be made in the optical transparent substrate 5. In FIG. 7, light is guided through the area encompassed by the holes 17, normal to the surface of the page. The figure illustrates how a system of confining light might look. The apertures 17 in the substrate 5 may be filled with a polyimid, or similar substance having an index of refraction lower than that of the substrate's 5. With a lower index of refraction in the apertures 17, light will be reflected away from the apertures 17. The apertures 17 would then act as a light confining structure by deflecting light towards the center of the circular structure. These apertures 17 are not limited to a certain type of filling, but could be left unfilled (i.e., filled with air).

The index of refraction of the substrate 5 could be changed to direct light as desired. Material diffusion, compression, or ultraviolet exposure are examples of methods of creating an index step in refraction to change a boundary region from guiding to non-guiding regions.

Antireflection coatings and structures can also be used and structured in the package to minimize the coupling losses between the active optical components 8 and passive optical waveguide coupler 26. They may be disposed on the surface of the substrate 5 nearest to the optical fiber 12.

Figure 8:
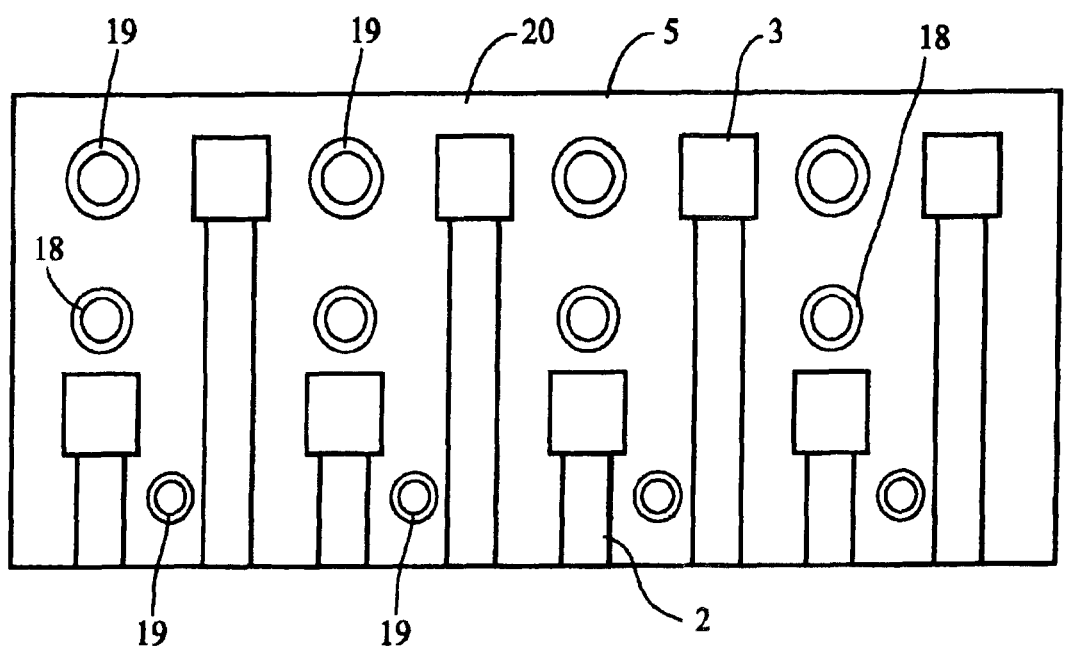
FIG. 8 is a transparent substrate of FIG. 1 containing a layer of a dielectric material.

The dielectric material 20 shown in FIG. 8 used for the precision alignment structures is placed on the substrate 5. Solder bumps 10, stud bumps, or metal plating shown in FIG. 8 on the electrical contact pads 3 may be used to electrically connect the package traces 2 to the optical components. These traces can go to other electro-optic components (not shown).

Alignment of optical fibers 12 can be determined by alignment apertures 21 through the substrates or by structures built upon the substrate, as shown in FIG. 6. These features, in turn, may be defined using photolithographic registration targets 4 on the substrate 5 and provide the alignment that is required between the active optical-component ports 1 and the optical fiber 12.

Figure 9:
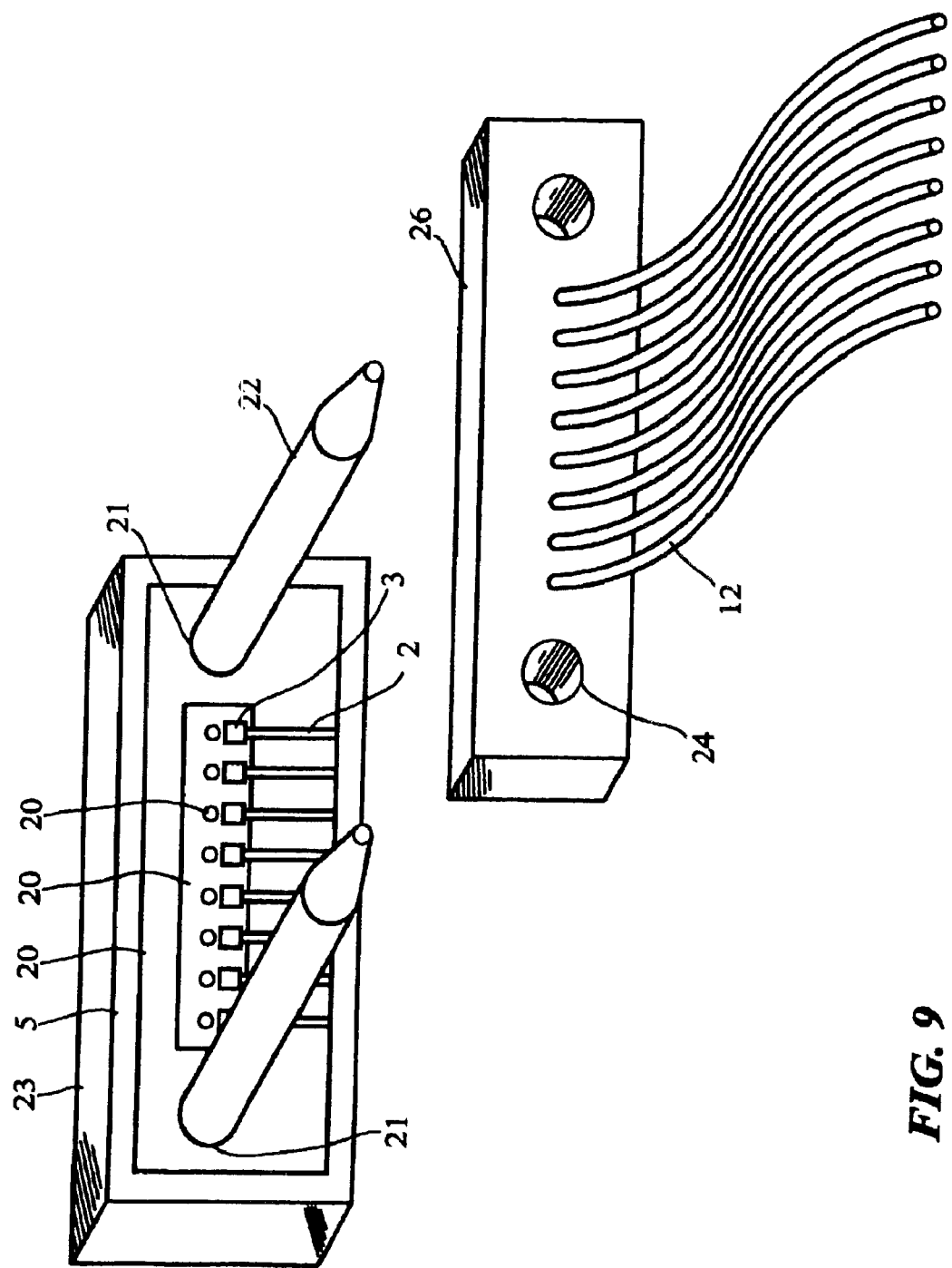
FIG. 9 is an perspective view of a optical system of FIG. 1 under an alternate embodiment wherein the array and substrate are disposed within a sealed can, further connected to a plurality of optical fibers.

The assembly shown in FIG. 8 can be placed in a housing 23 and sealed, as shown in FIG. 9. Guide pins 22 mounted in the housing 23 or guide structures fabricated on the transparent substrate 5 will guide the waveguide connector assembly 26 to the active optical ports 1.

Figure 10:
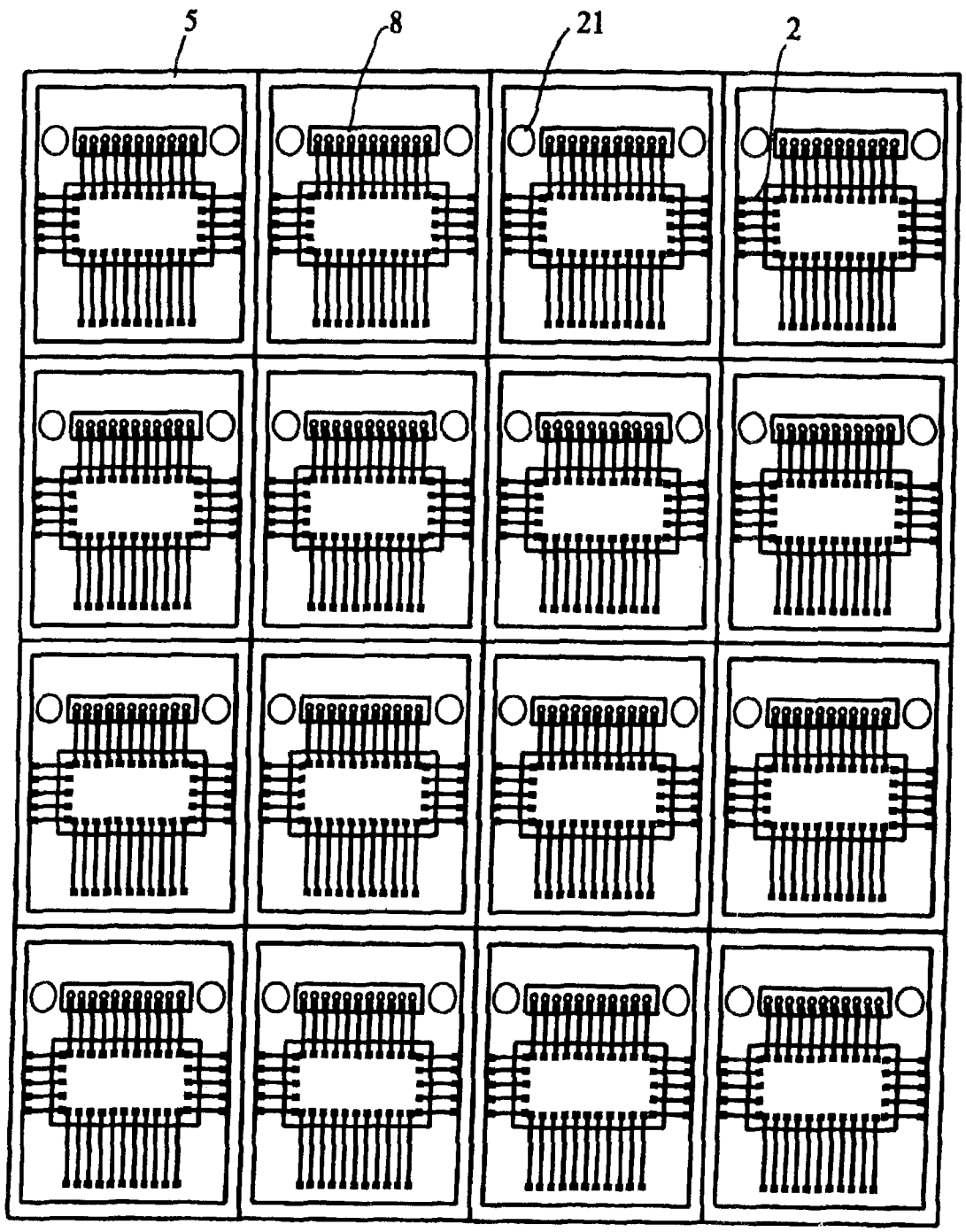
FIG. 10 is a top view of an array of optical systems of FIG. 1 disposed on a single, common transparent substrate.

Testing or burn-in may be performed on the optical assemblies 31 before use. This testing may be done once the optical array 8 has been placed and aligned (as discussed above) on some form of substrate 30 to facilitate handling of that component. These components may be electrically activated during these procedures, and the optical characteristics can also be examined at this time. FIG. 10 illustrates how optical components may be placed on a large transparent substrate 30. The substrate 30 may then be placed on a test bed that has electrical connections (bed of electrical probes or pads) to electrically activate these devices. The optical characteristics of these devices can be accessed through the transparent substrate 30, which is on the opposite side of the structure from the electrical interconnects. In this form, large arrays of optical assemblies 31 can be simultaneously burned-in and tested before connection to other devices. After testing, the common substrate 30 is partitioned (cut into assemblies 31) and the further packaging can be completed.

A specific embodiment of a method and apparatus for coupling an optical array to optical waveguides has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of transmitting an optical signal through a substrate, such method comprising the steps of:

provide a substantially continuous, optically transparent substrate;

providing a substantially continuous, optically transparent substrate;

providing a light transmission via through a first portion of the substantially continuous optically transparent substrate, said via having a substantially continuous, optically transparent center area defined by the first portion of the substrate, said center area being surrounded by a plurality of reflective or refractive elements that extend towards opposing surfaces of the substantially continuous, optically transparent substrate where the plurality of reflective or refractive elements separate the first portion of the substrate within the via from a second portion of the substrate outside the via; and transmitting an optical signal through the center area of the via and where the plurality of reflective or refractive elements that surround the via confine the transmitted optical signal within the via.

2. The method of transmitting an optical signal through a substrate as in claim 1 wherein the optically reflective or refractive periphery further comprises an annular ring of spaced-apart apertures.

3. The method of transmitting an optical signal through a substrate as in claim 2 further comprising filling the apertures with a material having a lower index of refraction than the substrate.

4. The method of transmitting an optical signal through a substrate as in claim 2 further comprising filling the apertures with air.

5. The method of transmitting an optical signal through a substrate as in claim 1 further comprising disposing a vertical cavity surface emitting laser on a first side of the substrate so that an axis of transmission of the laser is directed through the via.

6. The method of transmitting an optical signal through a substrate as in claim 5 further comprising disposing an optical fiber against a second side of the substrate so that the axis of transmission of the laser is directed into the optical fiber.

7. The method of transmitting an optical signal through a substrate as in claim 6 further comprising aligning the optical fiber to the via using a set of alignment guides.

8. The method of transmitting an optical signal through a substrate as in claim 7 further comprising supporting the optical fiber with an external waveguide coupler.

9. The method of transmitting an optical signal through a substrate as in claim 8 further comprising disposing a set of guide pins in the substrate in alignment with the via and laser.

10. The method of transmitting an optical signal through a substrate as in claim 9 wherein the step of disposing a set of guide pins in the substrate further comprises abrading an aperture for each guide pin of the set of guide pins.

11. The method of transmitting an optical signal through a substrate as in claim 8 wherein the step of aligning further comprises engaging the alignment pins within a set of apertures within the coupler.

12. An apparatus for transmitting an optical signal through a substrate, such apparatus comprising:

a substantially continuous, optically transparent substrate; and a light transmission via extending through a first portion of the substantially continuous optically transparent substrate, said via having a substantially continuous, optically transparent center area defined by the first portion of the substrate, said center area surrounded by a plurality of reflective or refractive elements that extend towards opposing surfaces of the substantially continuous, optically transparent substrate where the plurality of reflective or refractive elements separate the first portion of the substrate from a second portion of the substrate and where the plurality of reflective or refractive elements confine the transmitted optical signal within the via.

13. The apparatus for transmitting an optical signal through a substrate as in claim 12 wherein the optically reflective or refractive periphery further comprises an annular ring of spaced-apart apertures.

14. The apparatus for transmitting an optical signal through a substrate as in claim 13 wherein the apertures further comprise a filling of a material having a lower index of refraction than the substrate.

15. The apparatus for transmitting an optical signal through a substrate as in claim 13 wherein the apertures further comprise a filling of air.

16. The apparatus for transmitting an optical signal through a substrate as in claim 12 further comprising a vertical cavity surface emitting laser disposed on a first side of the substrate so that an axis of transmission of the laser is directed through the via.

17. The apparatus for transmitting an optical signal through a substrate as in claim 16 further comprising disposing an optical fiber against a second side of the substrate so that the axis of transmission of the laser is directed into the optical fiber.

18. The apparatus for transmitting an optical signal through a substrate as in claim 17 further comprising a set of alignment guides adapted to align the optical fiber to the via.

19. The apparatus for transmitting an optical signal through a substrate as in claim 18 further comprising an external waveguide coupler adapted to support the optical fiber.

20. The apparatus for transmitting an optical signal through a substrate as in claim 19 further comprising a set of guide pins disposed in the substrate in alignment with the via and laser.

* * * * *